(12) United States Patent
Koch et al.

(10) Patent No.: US 11,526,444 B2
(45) Date of Patent: Dec. 13, 2022

(54) METHOD AND SYSTEM FOR PREDICTIVELY CACHING DATA

(71) Applicant: JPMorgan Chase Bank, N.A., New York, NY (US)

(72) Inventors: Ramin Koch, New York, NY (US); Eric-Andre Vigroux, New Rochelle, NY (US); Liang Zhou, New York, NY (US); Mathieu Cliche, New York, NY (US); Yihui Tang, Oakton, VA (US); Howard Spector, Woolwich, NJ (US); Rebecca Setting, Bear, DE (US); Neil V O'Donnell, Avondale, PA (US); Timothy Lorenz, Lewis Center, OH (US)

(73) Assignee: JPMorgan Chase Bank, N.A., New York, NY (US)

( * ) Notice: Subject to any disclaimer, the term of this patent is extended or adjusted under 35 U.S.C. 154(b) by 0 days.

(21) Appl. No.: 17/446,051

(22) Filed: Aug. 26, 2021

(65) Prior Publication Data

US 2022/0066932 A1    Mar. 3, 2022

Related U.S. Application Data

(60) Provisional application No. 63/071,652, filed on Aug. 28, 2020.

(51) Int. Cl.
  *G06F 12/08* (2016.01)
  *G06F 12/0802* (2016.01)

(52) U.S. Cl.
  CPC .............. *G06F 12/0802* (2013.01)

(58) Field of Classification Search
  CPC ................................ G06F 12/0802
  USPC ........................................ 711/118
  See application file for complete search history.

(56) References Cited

U.S. PATENT DOCUMENTS

2002/0116585 A1\* 8/2002 Scherr ............. G06F 16/9574
  709/200

\* cited by examiner

*Primary Examiner* — Jae U Yu
(74) *Attorney, Agent, or Firm* — Greenblum & Bernstein, P.L.C.

(57) ABSTRACT

A method for facilitating predictive caching of data is provided. The method includes retrieving raw data relating to user activity for a plurality of users, the user activity including a history of web resources accessed by a user; converting the raw data into a structured data set based on a predetermined criterion; generating a model based on the structured data set; training the model by using a training data set, the training data set including the user activity for a predetermined period of time; determining, by using the trained model, a predicted first web resource for the user; and automatically caching, in a memory, the predicted first web resource.

20 Claims, 8 Drawing Sheets

METHOD AND SYSTEM FOR PREDICTIVELY CACHING DATA

CROSS-REFERENCE TO RELATED APPLICATIONS

This application claims the benefit of U.S. Provisional patent application Ser. No. 63/071,652, filed Aug. 28, 2020, which is hereby incorporated by reference in its entirety.

BACKGROUND

1. Field of the Disclosure

This technology generally relates to methods and systems for predictively caching data, and more particularly to methods and systems for facilitating predictive caching of data based on machine learning models, non-personalized baselines, and personalized baselines.

2. Background Information

Many business entities provide services to consumers via web resources located in vast enterprise networks. The consumers may connect to the enterprise networks and retrieve the web resources from various locations around the world. To deliver the web resources, systems within the enterprise networks may temporarily store the web resources in more accessible computing components. Historically, delivering the web resources to a requesting consumer using conventional delivery mechanisms have resulted in varying degrees of success with respect to how efficiently the web resources are delivered.

One drawback of using conventional delivery mechanisms is that in many instances, the systems temporarily store web resources that are not needed by the consumer in the easily accessible components leaving the desired web resources in a location that is more difficult to access. As a result, the desired web resources are inefficiently routed through numerous networked components before arriving at a consumer device. Additionally, the inefficient routing of the desired web resources may result in increased latency and network congestion, as well as negatively affect consumer experience.

Therefore, there is a need for a caching system that utilizes machine learning techniques to anticipate consumer needs and accurately store desired web resources for efficient retrieval by the consumer.

SUMMARY

The present disclosure, through one or more of its various aspects, embodiments, and/or specific features or sub-components, provides, inter alia, various systems, servers, devices, methods, media, programs, and platforms for facilitating predictive caching of data based on machine learning models, non-personalized baselines, and personalized baselines.

According to an aspect of the present disclosure, a method for facilitating predictive caching of data is provided. The method may be implemented by at least one processor. The method may include retrieving raw data relating to user activity for a plurality of users, the user activity may include a history of web resources accessed by a user; converting the raw data into a structured data set based on at least one predetermined criterion; generating at least one model based on the structured data set; training the at least one model by using a training data set, the training data set may include the user activity for a predetermined period of time; determining, by using the trained at least one model, at least one predicted first web resource for the user; and automatically caching, in a memory, the at least one predicted first web resource.

In accordance with an exemplary embodiment, the method may further include determining a non-personalized baseline from the raw data, the non-personalized baseline may correspond to at least one predicted group web resource for the plurality of users; determining at least one predicted second web resource for the user based on the non-personalized baseline; and automatically caching the at least one predicted second web resource.

In accordance with an exemplary embodiment, the method may further include associating at least one data element in the raw data with the user; determining a personalized baseline from the at least one data element, the personalized baseline may correspond to at least one predicted personal web resource for the user; determining at least one predicted third web resource for the user based on the personalized baseline; and automatically caching the at least one predicted third web resource.

In accordance with an exemplary embodiment, the raw data may include at least one from among user behavior data and application programing interface log data.

In accordance with an exemplary embodiment, for the converting, the method may further include translating the raw data into a numeric format; identifying at least one error in the translated raw data, the at least one error may include at least one from among a missing value and an outlier value in a data table; and automatically correcting the identified at least one error.

In accordance with an exemplary embodiment, the at least one model may include at least one from among a machine learning model, a mathematical model, a process model, and a data model.

In accordance with an exemplary embodiment, the method may further include determining a geographical location of the user based on at least one from among a corresponding user activity and a corresponding user profile; identifying at least one adjacent memory based on at least one predetermined guideline, the at least one predetermined guideline may include a distance to the determined geographical location of the user; and automatically caching, in the identified at least one adjacent memory, the at least one predicted first web resource.

In accordance with an exemplary embodiment, the at least one adjacent memory may include at least one edge service that prioritizes data communication and data collection from at least one edge device, the at least one edge device may relate to a networked computing system that is usable to store information.

In accordance with an exemplary embodiment, the at least one edge device may include at least one from among a private cloud provider and a public cloud provider, the at least one edge device may correspond to an ingress point that is determined to be closest to customer network traffic.

In accordance with an exemplary embodiment, the method may further include generating at least one graphical element, the at least one graphical element may include information relating to at least one from among the at least one model, the at least one training data set, the at least one predicted first web resource, and the automatic caching; and displaying, via a graphical user interface, the at least one graphical element.

According to an aspect of the present disclosure, a computing device configured to implement an execution of a method for facilitating predictive caching of data is disclosed. The computing device comprising a processor; a memory; and a communication interface coupled to each of the processor and the memory, wherein the processor may be configured to retrieve raw data relating to user activity for a plurality of users, the user activity may include a history of web resources accessed by a user; convert the raw data into a structured data set based on at least one predetermined criterion; generate at least one model based on the structured data set; train the at least one model by using a training data set, the training data set may include the user activity for a predetermined period of time; determine, by using the trained at least one model, at least one predicted first web resource for the user; and automatically cache, in a memory, the at least one predicted first web resource.

In accordance with an exemplary embodiment, the processor may be further configured to determine a non-personalized baseline from the raw data, the non-personalized baseline may correspond to at least one predicted group web resource for the plurality of users; determine at least one predicted second web resource for the user based on the non-personalized baseline; and automatically cache, in the memory, the at least one predicted second web resource.

In accordance with an exemplary embodiment, the processor may be further configured to associate at least one data element in the raw data with the user; determine a personalized baseline from the at least one data element, the personalized baseline may correspond to at least one predicted personal web resource for the user; determine at least one predicted third web resource for the user based on the personalized baseline; and automatically cache, in the memory, the at least one predicted third web resource.

In accordance with an exemplary embodiment, the raw data may include at least one from among user behavior data and application programing interface log data.

In accordance with an exemplary embodiment, for the converting, the processor may be further configured to translate the raw data into a numeric format; identify at least one error in the translated raw data, the at least one error may include at least one from among a missing value and an outlier value in a data table; and automatically correct the identified at least one error.

In accordance with an exemplary embodiment, the at least one model may include at least one from among a machine learning model, a mathematical model, a process model, and a data model.

In accordance with an exemplary embodiment, the processor may be further configured to determine a geographical location of the user based on at least one from among a corresponding user activity and a corresponding user profile; identify at least one adjacent memory based on at least one predetermined guideline, the at least one predetermined guideline may include a distance to the determined geographical location of the user; and automatically cache, in the identified at least one adjacent memory, the at least one predicted first web resource.

In accordance with an exemplary embodiment, the at least one adjacent memory may include at least one edge service that prioritizes data communication and data collection from at least one edge device, the at least one edge device may relate to a networked computing system that is usable to store information.

In accordance with an exemplary embodiment, the at least one edge device may include at least one from among a private cloud provider and a public cloud provider, the at least one edge device may correspond to an ingress point that is determined to be closest to customer network traffic.

In accordance with an exemplary embodiment, the processor may be further configured to generate at least one graphical element, the at least one graphical element may include information relating to at least one from among the at least one model, the at least one training data set, the at least one predicted first web resource, and the automatic caching; and display, via a graphical user interface, the at least one graphical element.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

DETAILED DESCRIPTION

Through one or more of its various aspects, embodiments and/or specific features or sub-components of the present disclosure, are intended to bring out one or more of the advantages as specifically described above and noted below.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

Figure 1:
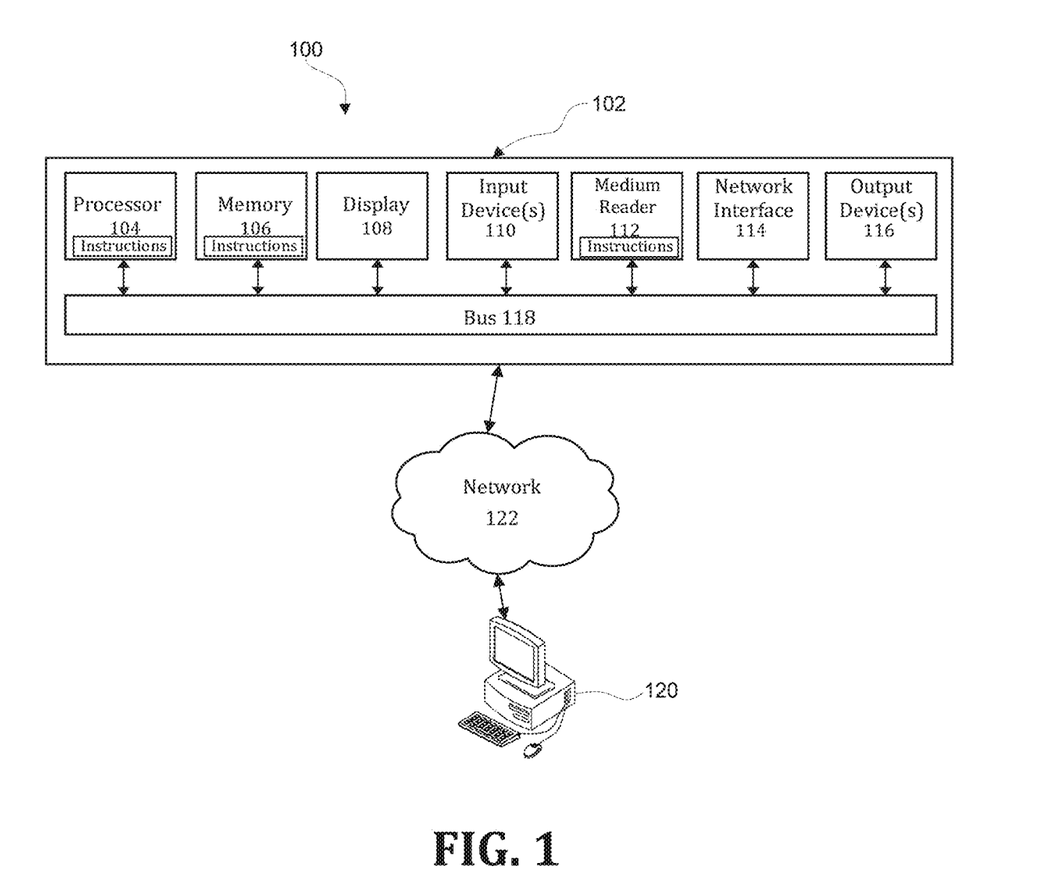
FIG. 1 illustrates an exemplary computer system.

FIG. 1 is an exemplary system for use in accordance with the embodiments described herein. The system 100 is generally shown and may include a computer system 102, which is generally indicated.

The computer system 102 may include a set of instructions that can be executed to cause the computer system 102 to perform any one or more of the methods or computer-based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed) network environment. The computer system 102, or portions thereof, may be implemented as, or incorporated into, various devices, such as a personal computer, a tablet computer, a set-top box, a personal digital assistant, a mobile device, a palmtop computer, a laptop computer, a desktop computer, a communications device, a wireless smart phone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term "system" shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general-purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data and executable instructions, and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disk read only memory (CD-ROM), digital versatile disk (DVD), floppy disk, blu-ray disk, or any other form of storage medium known in the art. Memories may be volatile or non-volatile, secure and/or encrypted, unsecure and/or unencrypted. Of course, the computer memory 106 may comprise any combination of memories or a single storage.

The computer system 102 may further include a display 108, such as a liquid crystal display (LCD), an organic light emitting diode (OLED), a flat panel display, a solid-state display, a cathode ray tube (CRT), a plasma display, or any other type of display, examples of which are well known to skilled persons.

The computer system 102 may also include at least one input device 110, such as a keyboard, a touch-sensitive input screen or pad, a speech input, a mouse, a remote control device having a wireless keypad, a microphone coupled to a speech recognition engine, a camera such as a video camera or still camera, a cursor control device, a global positioning system (GPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g., software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 110 during execution by the computer system 102.

Furthermore, the computer system 102 may include any additional devices, components, parts, peripherals, hardware, software, or any combination thereof which are commonly known and understood as being included with or within a computer system, such as, but not limited to, a network interface 114 and an output device 116. The output device 116 may be, but is not limited to, a speaker, an audio out, a video out, a remote-control output, a printer, or any combination thereof.

Each of the components of the computer system 102 may be interconnected and communicate via a bus 118 or other communication link. As shown in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, Bluetooth, Zigbee, infrared, near field communication, ultraband, or any combination thereof. Those skilled in the art appreciate that additional networks 122 which are known and understood may additionally or alternatively be used and that the exemplary networks 122 are not limiting or exhaustive. Also, while the network 122 is shown in FIG. 1 as a wireless network, those skilled in the art appreciate that the network 122 may also be a wired network.

The additional computer device 120 is shown in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

In accordance with various embodiments of the present disclosure, the methods described herein may be implemented using a hardware computer system that executes software programs. Further, in an exemplary, non-limited embodiment, implementations can include distributed processing, component/object distributed processing, and parallel processing. Virtual computer system processing can be constructed to implement one or more of the methods or functionalities as described herein, and a processor described herein may be used to support a virtual processing environment.

As described herein, various embodiments provide optimized methods and systems for facilitating predictive caching of data based on machine learning models, non-personalized baselines, and personalized baselines.

Figure 2:
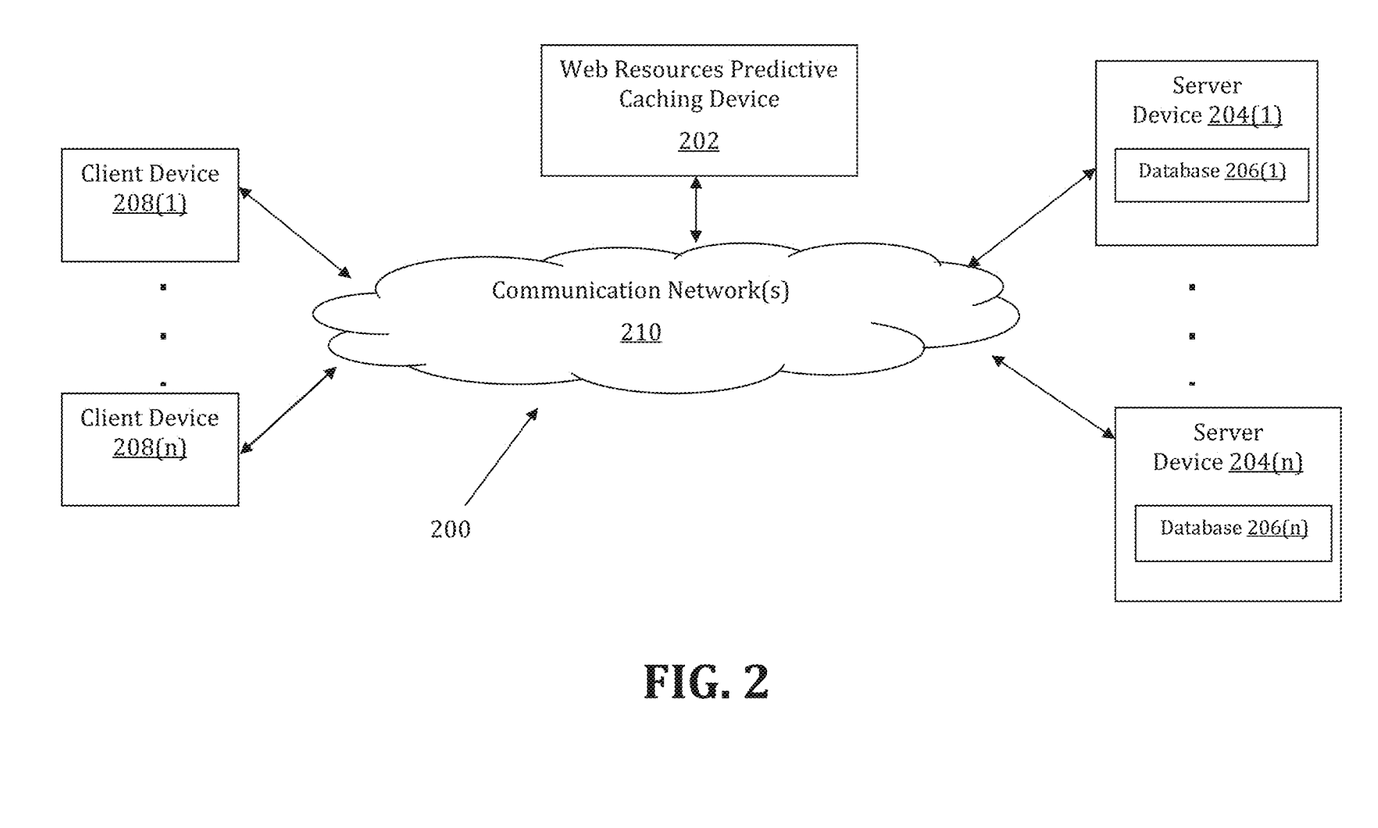
FIG. 2 illustrates an exemplary diagram of a network environment.

Referring to FIG. 2, a schematic of an exemplary network environment 200 for implementing a method for facilitating predictive caching of data based on machine learning models, non-personalized baselines, and personalized baselines is illustrated. In an exemplary embodiment, the method is executable on any networked computer platform, such as, for example, a personal computer (PC).

The method for facilitating predictive caching of data based on machine learning models, non-personalized baselines, and personalized baselines may be implemented by a Web Resources Predictive Caching (WRPC) device 202. The WRPC device 202 may be the same or similar to the computer system 102 as described with respect to FIG. 1. The WRPC device 202 may store one or more applications that can include executable instructions that, when executed by the WRPC device 202, cause the WRPC device 202 to perform actions, such as to transmit, receive, or otherwise process network messages, for example, and to perform other actions described and illustrated below with reference to the figures. The application(s) may be implemented as modules or components of other applications. Further, the application(s) can be implemented as operating system extensions, modules, plugins, or the like.

Even further, the application(s) may be operative in a cloud-based computing environment. The application(s) may be executed within or as virtual machine(s) or virtual server(s) that may be managed in a cloud-based computing environment. Also, the application(s), and even the WRPC device 202 itself, may be located in virtual server(s) running in a cloud-based computing environment rather than being tied to one or more specific physical network computing devices. Also, the application(s) may be running in one or more virtual machines (VMs) executing on the WRPC device 202. Additionally, in one or more embodiments of this technology, virtual machine(s) running on the WRPC device 202 may be managed or supervised by a hypervisor.

In the network environment 200 of FIG. 2, the WRPC device 202 is coupled to a plurality of server devices 204(1)-204(n) that hosts a plurality of databases 206(1)-206(n), and also to a plurality of client devices 208(1)-208(n) via communication network(s) 210. A communication interface of the WRPC device 202, such as the network interface 114 of the computer system 102 of FIG. 1, operatively couples and communicates between the WRPC device 202, the server devices 204(1)-204(n), and/or the client devices 208(1)-208(n), which are all coupled together by the communication network(s) 210, although other types and/or numbers of communication networks or systems with other types and/or numbers of connections and/or configurations to other devices and/or elements may also be used.

The communication network(s) 210 may be the same or similar to the network 122 as described with respect to FIG. 1, although the WRPC device 202, the server devices 204(1)-204(n), and/or the client devices 208(1)-208(n) may be coupled together via other topologies. Additionally, the network environment 200 may include other network devices such as one or more routers and/or switches, for example, which are well known in the art and thus will not be described herein. This technology provides a number of advantages including methods, non-transitory computer readable media, and WRPC devices that efficiently implement a method for facilitating predictive caching of data based on machine learning models, non-personalized baselines, and personalized baselines.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 210 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

The WRPC device 202 may be a standalone device or integrated with one or more other devices or apparatuses, such as one or more of the server devices 204(1)-204(n), for example. In one particular example, the WRPC device 202 may include or be hosted by one of the server devices 204(1)-204(n), and other arrangements are also possible. Moreover, one or more of the devices of the WRPC device 202 may be in a same or a different communication network including one or more public, private, or cloud networks, for example.

The plurality of server devices 204(1)-204(n) may be the same or similar to the computer system 102 or the computer device 120 as described with respect to FIG. 1, including any features or combination of features described with respect thereto. For example, any of the server devices 204(1)-204(n) may include, among other features, one or more processors, a memory, and a communication interface, which are coupled together by a bus or other communication link, although other numbers and/or types of network devices may be used. The server devices 204(1)-204(n) in this example may process requests received from the WRPC device 202 via the communication network(s) 210 according to the HTTP-based and/or JavaScript Object Notation (JSON) protocol, for example, although other protocols may also be used.

The server devices 204(1)-204(n) may be hardware or software or may represent a system with multiple servers in a pool, which may include internal or external networks. The server devices 204(1)-204(n) hosts the databases 206(1)-206(n) that are configured to store data that relates to raw data, structured data sets, training data, generated models, and cached web resources.

Although the server devices 204(1)-204(n) are illustrated as single devices, one or more actions of each of the server devices 204(1)-204(n) may be distributed across one or more distinct network computing devices that together comprise one or more of the server devices 204(1)-204(n). Moreover, the server devices 204(1)-204(n) are not limited to a particular configuration. Thus, the server devices 204(1)-204(n) may contain a plurality of network computing devices that operate using a master/slave approach, whereby one of the network computing devices of the server devices 204(1)-204(n) operates to manage and/or otherwise coordinate operations of the other network computing devices.

The server devices 204(1)-204(n) may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

The plurality of client devices 208(1)-208(n) may also be the same or similar to the computer system 102 or the computer device 120 as described with respect to FIG. 1, including any features or combination of features described with respect thereto. For example, the client devices 208(1)-208(n) in this example may include any type of computing device that can interact with the WRPC device 202 via communication network(s) 210. Accordingly, the client devices 208(1)-208(n) may be mobile computing devices, desktop computing devices, laptop computing devices, tablet computing devices, virtual machines (including cloud-based computers), or the like, that host chat, e-mail, or voice-to-text applications, for example. In an exemplary embodiment, at least one client device 208 is a wireless mobile communication device, i.e., a smart phone.

The client devices 208(1)-208(n) may run interface applications, such as standard web browsers or standalone client applications, which may provide an interface to communicate with the WRPC device 202 via the communication network(s) 210 in order to communicate user requests and information. The client devices 208(1)-208(n) may further include, among other features, a display device, such as a display screen or touchscreen, and/or an input device, such as a keyboard, for example.

Although the exemplary network environment 200 with the WRPC device 202, the server devices 204(1)-204(n), the client devices 208(1)-208(n), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment 200, such as the WRPC device 202, the server devices 204(1)-204(n), or the client devices 208(1)-208(n), for example, may be configured to operate as virtual instances on the same physical machine. In other words, one or more of the WRPC device 202, the server devices 204(1)-204(n), or the client devices 208(1)-208(n) may operate on the same physical device rather than as separate devices communicating through communication network(s) 210. Additionally, there may be more or fewer WRPC devices 202, server devices 204(1)-204(n), or client devices 208(1)-208(n) than illustrated in FIG. 2.

In addition, two or more computing systems or devices may be substituted for any one of the systems or devices in any example. Accordingly, principles and advantages of distributed processing, such as redundancy and replication also may be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

Figure 3:
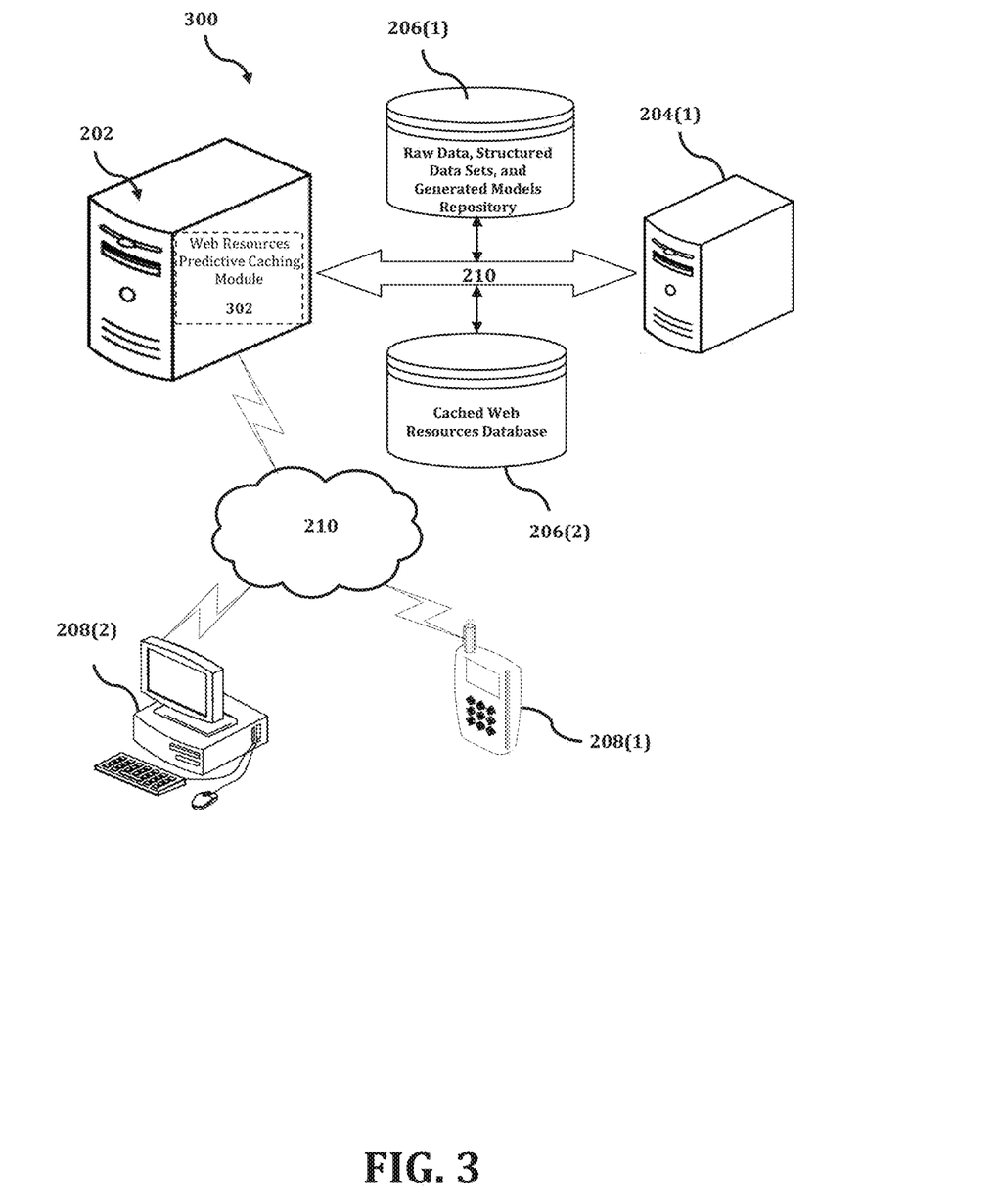
FIG. 3 shows an exemplary system for implementing a method for facilitating predictive caching of data based on machine learning models, non-personalized baselines, and personalized baselines.

The WRPC device 202 is described and shown in FIG. 3 as including a web resources predictive caching module 302, although it may include other rules, policies, modules, databases, or applications, for example. As will be described below, the web resources predictive caching module 302 is configured to implement a method for facilitating predictive caching of data based on machine learning models, non-personalized baselines, and personalized baselines.

An exemplary process 300 for implementing a mechanism for facilitating predictive caching of data based on machine learning models, non-personalized baselines, and personalized baselines by utilizing the network environment of FIG. 2 is shown as being executed in FIG. 3. Specifically, a first client device 208(1) and a second client device 208(2) are illustrated as being in communication with WRPC device 202. In this regard, the first client device 208(1) and the second client device 208(2) may be "clients" of the WRPC device 202 and are described herein as such. Nevertheless, it is to be known and understood that the first client device 208(1) and/or the second client device 208(2) need not necessarily be "clients" of the WRPC device 202, or any entity described in association therewith herein. Any additional or alternative relationship may exist between either or both of the first client device 208(1) and the second client device 208(2) and the WRPC device 202, or no relationship may exist.

Further, WRPC device 202 is illustrated as being able to access a raw data, structured data sets, and generated models repository 206(1) and a cached web resources database 206(2). The web resources predictive caching module 302 may be configured to access these databases for implementing a method for facilitating predictive caching of data based on machine learning models, non-personalized baselines, and personalized baselines.

The first client device 208(1) may be, for example, a smart phone. Of course, the first client device 208(1) may be any additional device described herein. The second client device 208(2) may be, for example, a personal computer (PC). Of course, the second client device 208(2) may also be any additional device described herein.

The process may be executed via the communication network(s) 210, which may comprise plural networks as described above. For example, in an exemplary embodiment, either or both of the first client device 208(1) and the second client device 208(2) may communicate with the WRPC device 202 via broadband or cellular communication. Of course, these embodiments are merely exemplary and are not limiting or exhaustive.

Upon being started, the web resources predictive caching module 302 executes a process for facilitating predictive caching of data based on machine learning models, non-personalized baselines, and personalized baselines. An exemplary process for facilitating predictive caching of data based on machine learning models, non-personalized baselines, and personalized baselines is generally indicated at flowchart 400 in FIG. 4.

Figure 4:
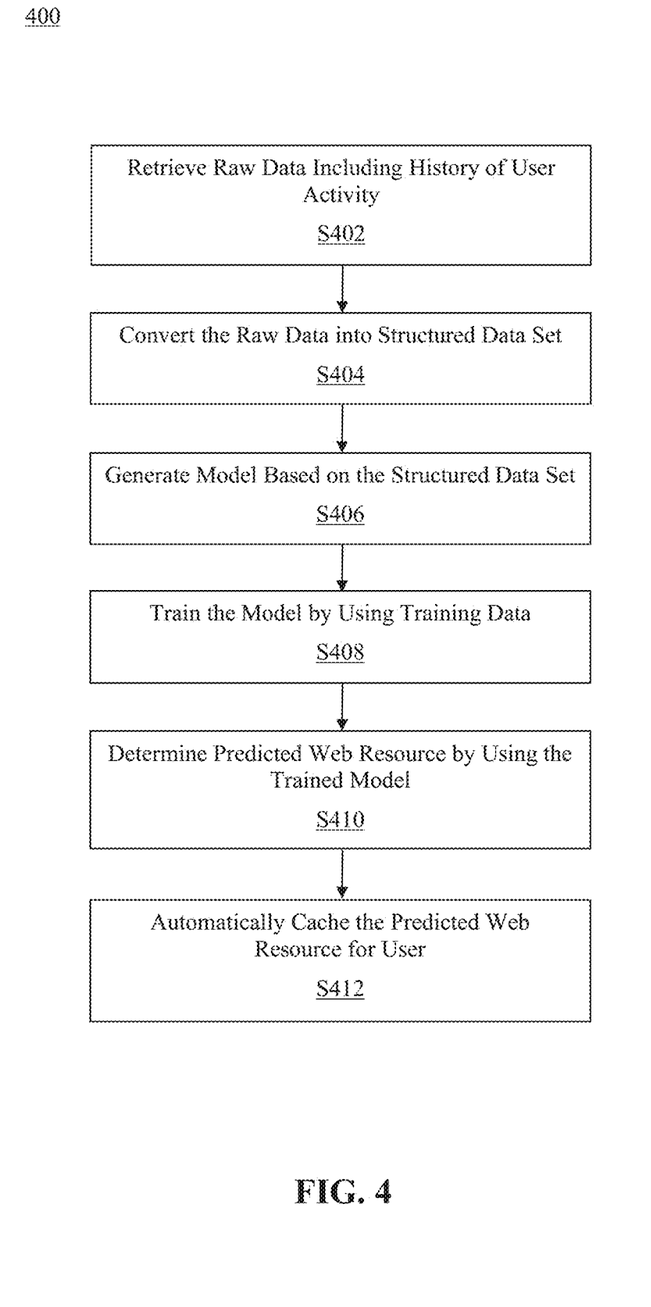
FIG. 4 is a flowchart of an exemplary process for implementing a method for facilitating predictive caching of data based on machine learning models, non-personalized baselines, and personalized baselines.

In the process 400 of FIG. 4, at step S402, raw data relating to user activity for a plurality of users may be retrieved. The user activity may include a history of web resources previously accessed by a user. For example, the history of web resources may include frequency and duration information relating to web sites the user has accessed. In an exemplary embodiment, the raw data may include at least one from among user behavior data and application programming interface (API) log data. As will be appreciated by a person of ordinary skill in the art, the raw data may include numeric values, alphabetical values, symbols, and images.

At step S404, the raw data may be converted into a structured data set based on a predetermined criterion. The conversion process may translate the raw data into a different form. In an exemplary embodiment, the predetermined criterion may relate to a required format that is usable by a computing component. For example, the predetermined criterion may include a numeric format requirement due to processing limitations of the computing component. As will be appreciated by a person of ordinary skill in the art, the structured data set may include data that have been organized based on the predetermined criterion into data structures such as, for example, a data table and a data matrix.

In another exemplary embodiment, the conversion process may include data pre-processing to transform the raw data into a format usable by machine learning techniques. The pre-processing may further include translating the raw data into a numeric format. Errors in the raw data may be identified in the translated numeric format. The identified errors may include at least one from among a missing value and an outlier value in a data table of the translated data. After detection, the identified errors may be automatically corrected.

At step S406, a model based on the structured data set may be generated by using machine learning techniques. The model may use the user activity to forecast top uniform resource locators (URLs) of web resources the user may request in the future. In an exemplary embodiment, machine learning and pattern recognition may include supervised learning algorithms such as, for example, k-medoids analysis, regression analysis, decision tree analysis, random forest analysis, k-nearest neighbors analysis, logistic regression analysis, etc. In another exemplary embodiment, machine learning analytical techniques may include unsupervised learning algorithms such as, for example, Apriori analysis, K-means clustering analysis, etc. In another exemplary embodiment, machine learning analytical techniques may include reinforcement learning algorithms such as, for example, Markov Decision Process, etc.

In another exemplary embodiment, the model may include at least one from among a machine learning model, a mathematical model, a process model, and a data model. The model may also include stochastic models such as, for example, a Markov model that is used to model randomly changing systems. In stochastic models, the future states of a system may be assumed to depend only on the current state of the system.

In another exemplary embodiment, the model may be based on a machine learning algorithm. The machine learning algorithm may include at least one from among a process and a set of rules to be followed by a computer in calculations and other problem-solving operations such as, for example, a linear regression algorithm, a logistic regression algorithm, a decision tree algorithm, or a Naive Bayes algorithm.

In another exemplary embodiment, the model may include training models such as, for example, a machine learning model which is generated to be further trained on additional data. Once the training model has been sufficiently trained, the training model may be deployed onto various connected systems to be utilized. In another exemplary embodiment, the training model may be sufficiently trained when model assessment methods such as, for example, a holdout method, a K-fold-cross-validation method, and a bootstrap method determine that the training model's least squares error rate, true positive rate, true negative rate, false positive rate, and false negative rates are within predetermined ranges. In another exemplary embodiment, the training model may be operable, i.e., actively utilized by an organization, while continuing to be trained using new data. In another exemplary embodiment, the models may be generated using at least one from among an artificial neural network technique, a decision tree technique, a support vector machines technique, a Bayesian network technique, and a genetic algorithms technique.

At step S408, the model may be trained by using a training data set. The training data set may include the user activity for a predetermined period of time. In an exemplary embodiment, the predetermined period of time may include a testing window of a week and a training window of a month. As will be appreciated by a person of ordinary skill in the art, the predetermined period of time may include any time interval necessary for a sufficient number of data points to be utilized in the training data set. For example, when a user sporadically requests a web resource, a time period of longer than a month may be necessary to obtain necessary data points for analysis.

At step S410, a predicted first web resource may be determined for the user by using the trained model. In an exemplary embodiment, a predicted first web resource may include an anticipated web resource that the user may request in the future. The predicted first web resource may include top five parent directories most likely to be visited by the user. In another exemplary embodiment, the web resource may include URLs of any data obtained from a computer network. For example, a web resource may include web pages, e-mail, information from databases, as well as web services.

At step S412, the predicted first web resource may be automatically cached in a memory. In an exemplary embodiment, a cache may include a high-speed data storage layer which temporarily stores a subset of data so that future requests for that data are served up faster than is possible by accessing the data's primary storage location. Caching may enable efficient reuse of previously retrieved or computed data as well as anticipatorily retrieved or computed data. As will be appreciated by a person of ordinary skill in the art, the data in a cache may be stored in fast access hardware such as, for example random-access memory (RAM) and may also be used in correlation with software components. The cache may increase data retrieval performance by reducing the need to access the underlying slower storage layer.

In another exemplary embodiment, a non-personalized baseline may be determined from the raw data. The non-personalized baseline may correspond to a predicted group web resource for the plurality of users. For example, the non-personalized baseline may include predictions of top five URLs for web resources that a plurality of users is most likely to request. As such, the non-personalized baseline may not correspond to any particular user. Then, a predicted second web resource may be determined for the user based on the non-personalized baseline. The predicted second web resource may be automatically cached in the memory.

In another exemplary embodiment, a data element in the raw data may be associated with the user. A personalized baseline may be determined from the associated data element. The personalized baseline may correspond to a predicted personal web resource for the user. For example, the personalized baseline may include predictions of top five URLs for web resources that each user in the plurality of users is most likely to request. As such, the personalized baseline may correspond to a particular user. Then, a predicted third web resource may be determined for the user based on the personalized baseline. The predicted third web resource may be automatically cached in the memory.

In another exemplary embodiment, a measure such as, for example, a F1 score may be calculated to determine the accuracy of the machine learning model, the non-personalized baseline, and the personalized baseline in predicting the user's web resource requirements. The measure may be calculated based on a precision rate and a recall rate when web resources are automatically cached. The precision rate may include a number of correctly identified positive results divided by a number of all positive results and those not identified correctly. The recall rate may include a number of correctly identified positive results divided by a number of all samples that should have been identified as positive.

In another exemplary embodiment, a graphical element such as, for example, a dashboard may be generated. The graphical element may include information that relates to at least one from among the model, the training data set, the predicted first web resource, and the automatic caching. Then, the graphical element may be displayed via a graphical user interface. In another exemplary embodiment, the graphical element may be configured to receive input from an administrator. The administrator may interact with the graphical element to display specific data, retrieve specific data, as well as facilitate the training of the model. For example, the administrator may interact with the graphical element by hover a cursor over a certain data element to retrieve additional corresponding data in a popup window.

In another exemplary embodiment, a geographical location of a user may be determined based on at least one from among a corresponding user activity and a corresponding user profile. The geographical location may include a predicted geographical location of the user based on a determination by the model. An adjacent memory may then be identified based on a predetermined guideline. The predetermined guideline may include a distance to the determined geographical location of the user. For example, the predetermined guideline may indicate that a data center within 100 miles of the customer is identified as an adjacent data storage location. Then, the predicted first web resource may be automatically cached in the identified adjacent memory.

In another exemplary embodiment, the adjacent memory may include an edge service that prioritizes data communication and data collection from an edge device. The edge service may correspond to applications, which are deployed in all edge devices. In another exemplary embodiment, the applications may include at least one from among a monolithic application and a microservice application. The monolithic application may describe a single-tiered software application where the user interface and data access code are combined into a single program from a single platform. The monolithic application may be self-contained and independent from other computing applications.

In another exemplary embodiment, a microservice application may include a unique service and a unique process that communicates with other services and processes over a network to fulfill a goal. The microservice application may be independently deployable and organized around business capabilities. In another exemplary embodiment, the microservices may relate to a software development architecture such as, for example, an event-driven architecture made up of event producers and event consumers in a loosely coupled choreography. The event producer may detect or sense an event such as, for example, a significant occurrence or change in state for system hardware or software and represent the event as a message. The event message may then be transmitted to the event consumer via event channels for processing.

In another exemplary embodiment, the event-driven architecture may include a distributed data streaming platform such as, for example, an APACHE KAFKA platform for the publishing, subscribing, storing, and processing of event streams in real time. As will be appreciated by a person of ordinary skill in the art, each microservice in a microservice choreography may perform corresponding actions independently and may not require any external instructions.

In another exemplary embodiment, microservices may relate to a software development architecture such as, for example, a service-oriented architecture which arranges a complex application as a collection of coupled modular services. The modular services may include small, independently versioned, and scalable customer-focused services with specific business goals. The services may communicate with other services over standard protocols with well-defined interfaces. In another exemplary embodiment, the microservices may utilize technology-agnostic communication protocols such as, for example, a Hypertext Transfer Protocol (HTTP) to communicate over a network and may be implemented by using different programming languages, databases, hardware environments, and software environments.

In another exemplary embodiment, the edge service may be containerized and may be deployed on at least one from among a public container platform and a private container platform. The edge service may improve the responsiveness of query operations by using data stores, other services that are physically close to the edge service, and remote data caching. When the edge service needs to communicate with other edge services, the edge services may communication with a local instance of the other edge services.

In another exemplary embodiment, the edge device may relate to a networked computing system that is usable to store information. The edge device may include at least one from among a private cloud provider and a public cloud provider. The edge device may correspond to an ingress point that is determined to be closest to customer network traffic. For example, the edge device may correspond to an edge location closest to a customer where the edge services are deployed.

In another exemplary embodiment, a command query responsibility segregation (CQRS) technique may be utilized. The CQRS technique may separate operations that mutate state (i.e., commands) from operations that retrieve state (i.e., queries). This technique allows services to independently deploy and scale out endpoints that support read and write operations. In the context of edge services, this technique may be leverage so that the data required, query side of the operations can be deployed at the edge while keeping the system of record (SOR) located in a centralized, less highly available location. In another exemplary embodiment, CQRS may allow applications to decouple read operations from write operations to enable placement of the operations in different locations as well as separately scaling out the operations. In the context of edge devices, the read data may be located at the edge device while the system of record data is centrally located.

In another exemplary embodiment, a store and forward persisting technique may be utilized. The store and forward technique may be used to temporary persist command operations in the event that downstream applications are not available. This can be implemented in several ways, most preferably through a database or queuing technology. Frameworks such as, for example, a PHOTON framework has built-in support for this pattern and middleware platforms may also use this pattern with great success.

In another exemplary embodiment, a read through caching technique may be utilized. Edge services may leverage caching for scenarios where the data can be either retrieved from the SOR or recalculated. Using the cache as a temporary system of record, such as for data used in UI form flows, is an anti-pattern. Automatic fail over of a user session to another region should not cause the customer to experience any errors. The read through cache technique may provide edge services a tremendous boost in performance in cases where the data required is not located nearby.

In another exemplary embodiment, an edge device routing technique may be utilized. Each edge service may have an edge device specific domain name system (DNS) address such that application programming interface (API) calls between edge services use the DNS addresses. Routing to the edge service using either a global address or another edge device address is an anti-pattern.

In another exemplary embodiment, an edge device health check technique may be utilized. When a criticality of the edge service warrants that the edge device should be marked as unhealthy, customers may be directed away from the edge device and a health check endpoint that is associated with the edge service may be registered with a deployment proxy service (DPS) health check application. Health checking at an edge device level allows the platform to perform optimally by moving the customer to a healthy edge device.

Figure 5:
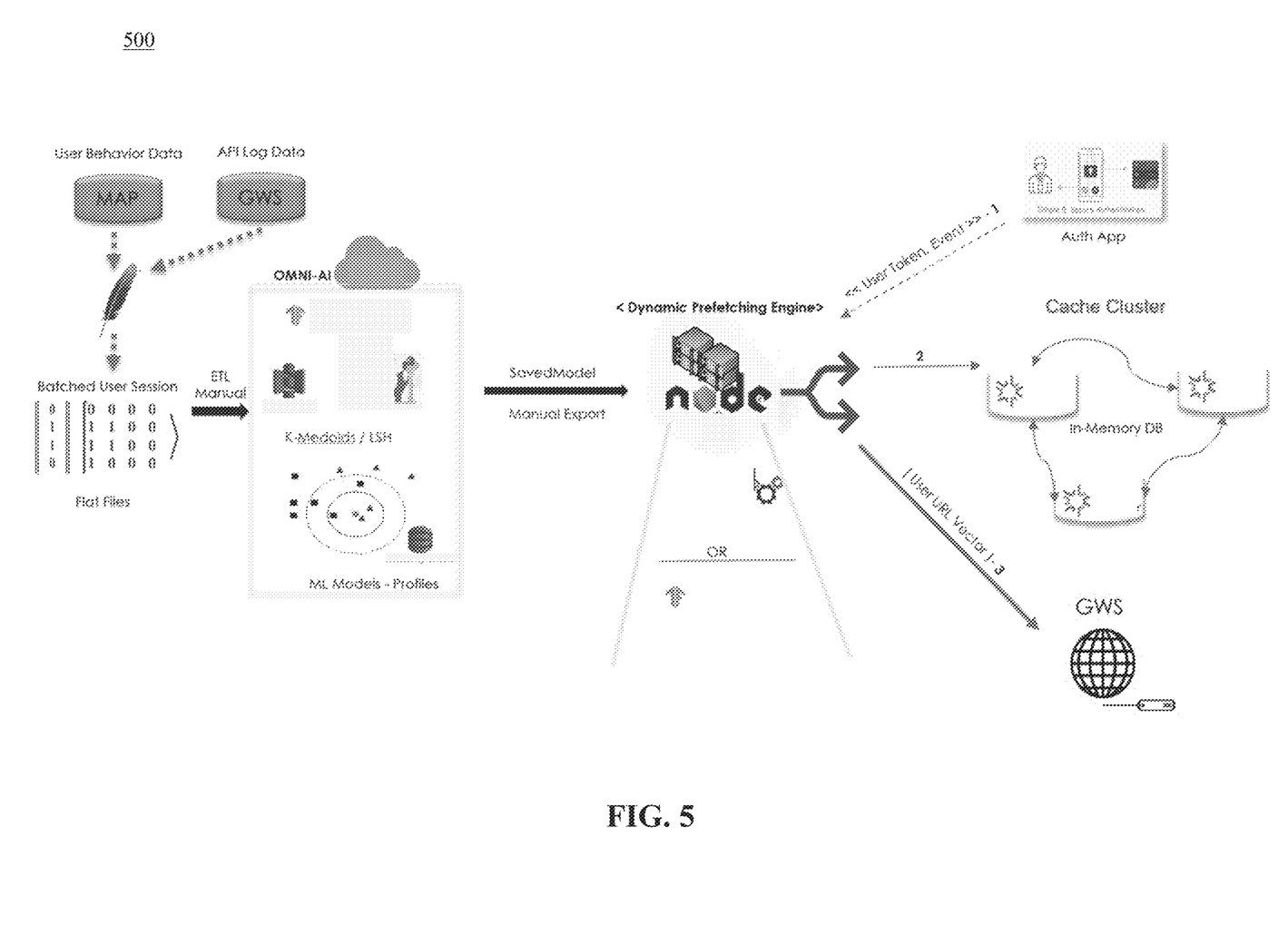
FIG. 5 is a diagram that illustrates an exemplary architecture that is usable for implementing a method for facilitating predictive caching of data based on machine learning models, non-personalized baselines, and personalized baselines, according to an exemplary embodiment.

FIG. 5 is a diagram 500 that illustrates an exemplary architecture 500 that is usable for implementing a method for facilitating predictive caching of data based on machine learning models, non-personalized baselines, and personalized baselines, according to an exemplary embodiment. The diagram may include a phase one architecture that is utilized during the architecture development phase of a domain driven design process. The phase one architecture may be used for product planning and feasibility analysis.

As illustrated in FIG. 5, user behavior data and application programing interface (API) log data may be retrieved from web services and applications. The retrieved data may be pre-processed and converted into batched user session flat files. The flat files may be extracted, transformed further, and loaded into an artificial intelligence application. The artificial intelligence application may utilize machine learning techniques to generate models based on the loaded data. The generated model may be saved and manually exported to a dynamic prefetching engine. The dynamic prefetching engine may retrieve authenticated user tokens and events at 1, access a cache cluster in a database based on the generated model at 2, and provide user URL vectors to a web service at 3. The dynamic prefetching engine may utilize the generated model to determine the user URL vector based on user information.

Figure 6:
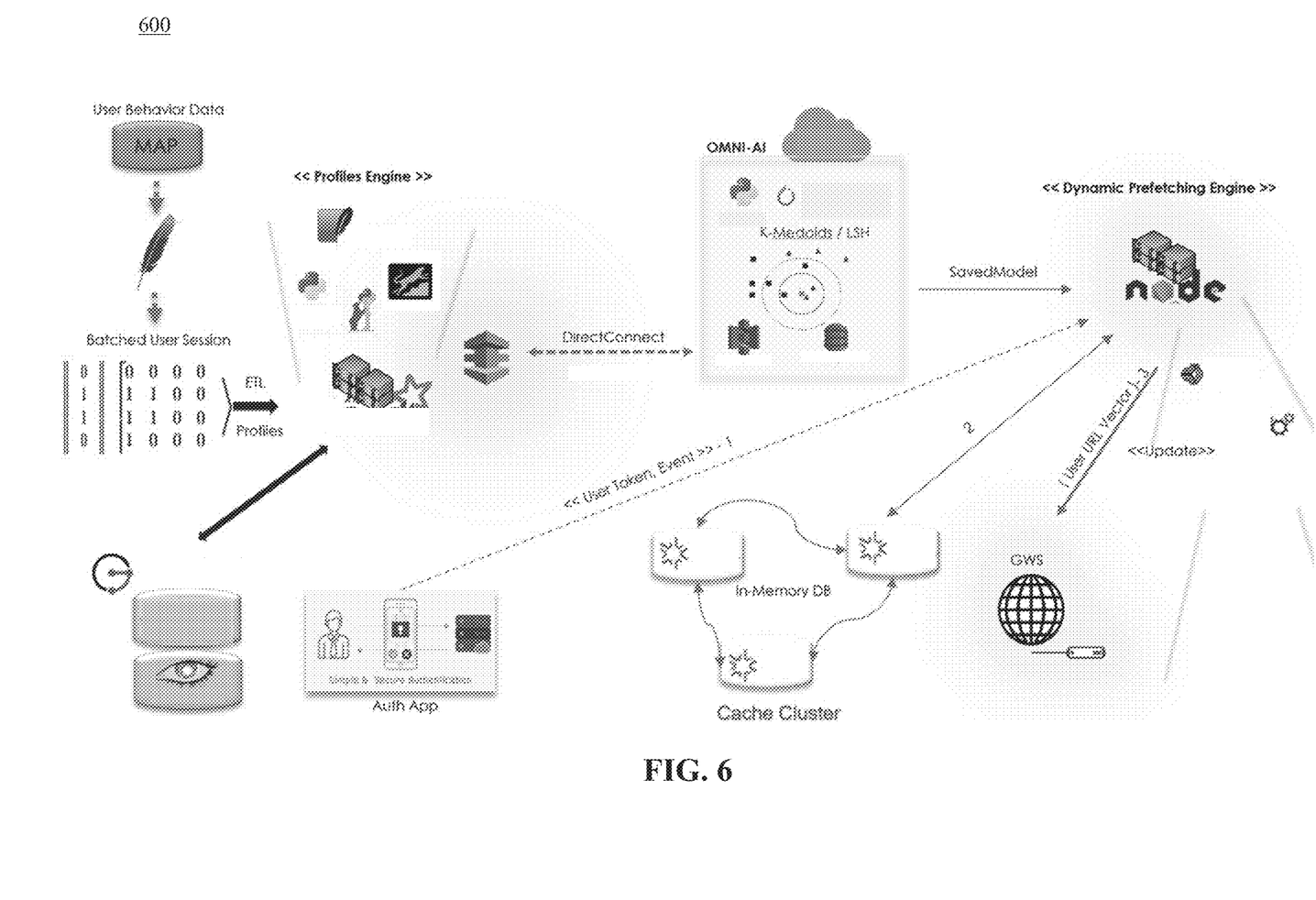
FIG. 6 is a diagram that illustrates an exemplary closed system architecture that is usable for implementing a method for facilitating predictive caching of data based on machine learning models, non-personalized baselines, and personalized baselines, according to an exemplary embodiment.

FIG. 6 is a diagram 600 that illustrates an exemplary closed system architecture 600 that is usable for implementing a method for facilitating predictive caching of data based on machine learning models, non-personalized baselines, and personalized baselines, according to an exemplary embodiment. The diagram may include a phase two architecture that is utilized during the architecture development phase of a domain driven design process. The phase two architecture may include a closed system with limited interoperability, portability, and access.

As illustrated in FIG. 6, user behavior data may be retrieved from web services and applications. The retrieved data may be pre-processed and converted into batched user session flat files. The flat files may be extracted, transformed further, and loaded into a profile engine for analysis and for correlation with a user. Additionally, the profile engine may also load graphs containing vertices and edges distributed across multi-machine clusters. The profile engine may include unified analytics engines for large-scale data processing. Then, the analyzed data may be directed to an artificial intelligence application. The artificial intelligence application may utilize machine learning techniques to generate models based on the analyzed data. The generated model may be saved and exported to a dynamic prefetching engine. The dynamic prefetching engine may retrieve authenticated user tokens and events at 1, access a cache cluster in a database based on the generated model at 2, and provide user URL vectors to a web service at 3. The dynamic prefetching engine may utilize the generated model to determine the user URL vector based on user information.

Figure 7:
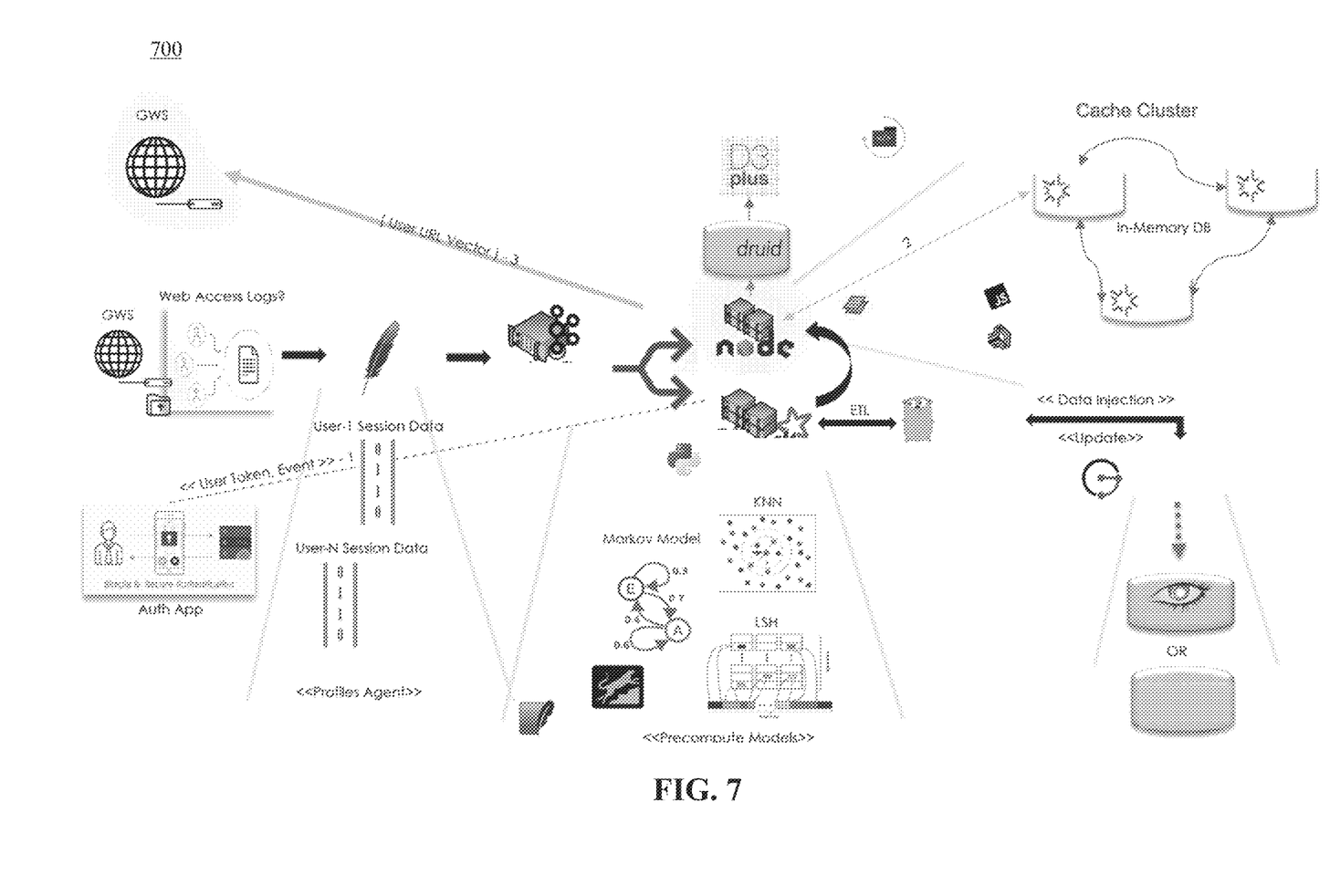
FIG. 7 is a diagram that illustrates an exemplary open system architecture that is usable for implementing a method for facilitating predictive caching of data based on machine learning models, non-personalized baselines, and personalized baselines, according to an exemplary embodiment.

FIG. 7 is a diagram 700 that illustrates an exemplary open system architecture 700 that is usable for implementing a method for facilitating predictive caching of data based on machine learning models, non-personalized baselines, and personalized baselines, according to an exemplary embodiment. The diagram may include a phase three architecture that is utilized during the architecture development phase of a domain driven design process. The phase three architecture may include an open system that provides interoperability, portability, and access.

As illustrated in FIG. 7, web access logs may be retrieved from web services and applications. The retrieved data may be pre-processed and converted into batched user session flat files by a profile agent. The profile agent may further process the flat files and correlate the flat files with a user. Then, the profile agent may direct the processed data to a stream processor such as, for example, a KAFKA stream processor. The stream processor manages the processing streams between a runtime environment and an artificial intelligence application.

In an exemplary embodiment, the artificial intelligence application may utilize machine learning techniques to generate models based on the analyzed data. The artificial intelligence application may utilize graphs for data injection and updating of the precompute models. The graphs may contain vertices and edges distributed across multi-machine clusters. In another exemplary embodiment, the runtime environment may include a dynamic prefetching engine. The dynamic prefetching engine may retrieve authenticated user tokens and events at 1, access a cache cluster in a database based on the generated model at 2, provide user URL vectors to a web service at 3, and export information to a data visualization computing component. The dynamic prefetching engine may utilize the generated model to determine the user URL vector based on user information.

Figure 8:
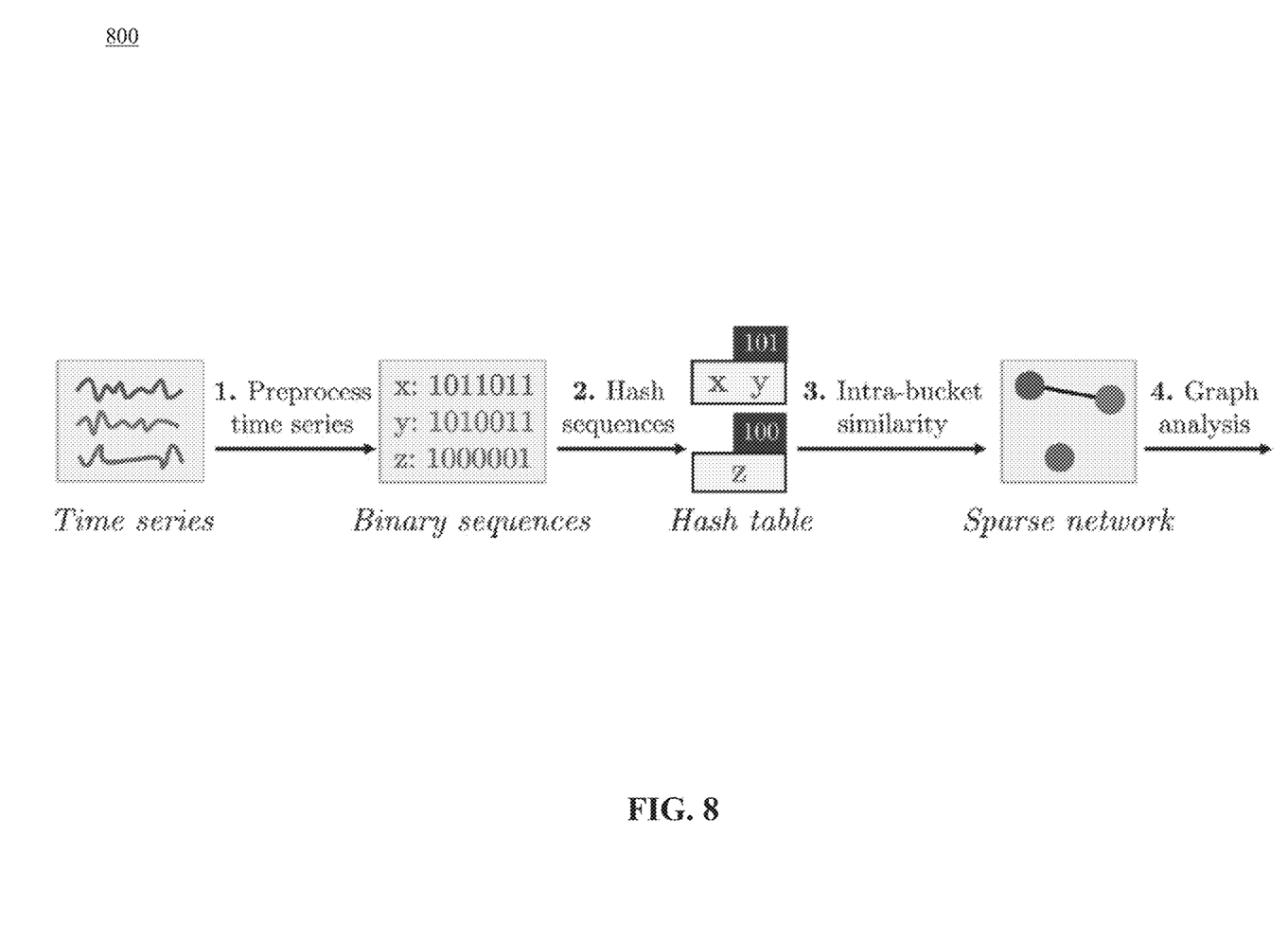
FIG. 8 is a diagram that illustrates an exemplary hierarchical clustering that is usable for implementing a method for facilitating predictive caching of data based on machine learning models, non-personalized baselines, and personalized baselines, according to an exemplary embodiment.

FIG. 8 is a diagram 800 that illustrates an exemplary hierarchical clustering 800 that is usable for implementing a method for facilitating predictive caching of data based on machine learning models, non-personalized baselines, and personalized baselines, according to an exemplary embodiment. The hierarchical clustering may include a similarity grouping of weekly time series data.

As illustrated in FIG. 8, the time series data may be preprocessed at 1 and converted into binary sequences. The binary sequences may then be hashed and directed to a hash table at 2. Intra-bucket similarities may be determined at 3 and the resulting data may be directed to a sparse network for further processing. The sparse network performs graph analysis on the resulting data at 4 and stores the graph in a graph storage component. The graphs may contain vertices and edges which are distributed across multi-machine clusters by the graph storage component.

Accordingly, with this technology, an optimized process for facilitating predictive caching of data based on machine learning models, non-personalized baselines, and personalized baselines is provided.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all of the elements and features of apparatus and systems that utilize the structures or methods described herein. Many other embodiments may be apparent to those of skill in the art upon reviewing the disclosure.

Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for facilitating predictive caching of data, the method being implemented by at least one processor, the method comprising:
retrieving, by the at least one processor, raw data relating to user activity for a plurality of users, the user activity including a history of web resources accessed by a user;
converting, by the at least one processor, the raw data into a structured data set based on at least one predetermined criterion;
generating, by the at least one processor, at least one model based on the structured data set;
training, by the at least one processor, the at least one model by using a training data set, the training data set including the user activity for a predetermined period of time;
determining, by the at least one processor using the trained at least one model, at least one predicted first web resource for the user; and
automatically caching, by the at least one processor in a memory, the at least one predicted first web resource.

2. The method of claim 1, further comprising:
determining, by the at least one processor, a non-personalized baseline from the raw data, the non-personalized baseline corresponding to at least one predicted group web resource for the plurality of users;
determining, by the at least one processor, at least one predicted second web resource for the user based on the non-personalized baseline; and
automatically caching, by the at least one processor in the memory, the at least one predicted second web resource.

3. The method of claim 1, further comprising:
associating, by the at least one processor, at least one data element in the raw data with the user;
determining, by the at least one processor, a personalized baseline from the at least one data element, the personalized baseline corresponding to at least one predicted personal web resource for the user;
determining, by the at least one processor, at least one predicted third web resource for the user based on the personalized baseline; and
automatically caching, by the at least one processor in the memory, the at least one predicted third web resource.

4. The method of claim 1, wherein the raw data includes at least one from among user behavior data and application programing interface log data.

5. The method of claim 1, wherein the converting further comprises:
translating, by the at least one processor, the raw data into a numeric format;
identifying, by the at least one processor, at least one error in the translated raw data, the at least one error including at least one from among a missing value and an outlier value in a data table; and
automatically correcting, by the at least one processor, the identified at least one error.

6. The method of claim 1, wherein the at least one model includes at least one from among a machine learning model, a mathematical model, a process model, and a data model.

7. The method of claim 1, further comprising:
determining, by the at least one processor, a geographical location of the user based on at least one from among a corresponding user activity and a corresponding user profile;
identifying, by the at least one processor, at least one adjacent memory based on at least one predetermined guideline, the at least one predetermined guideline including a distance to the determined geographical location of the user; and
automatically caching, by the at least one processor in the identified at least one adjacent memory, the at least one predicted first web resource.

8. The method of claim 7, wherein the at least one adjacent memory includes at least one edge service that prioritizes data communication and data collection from at least one edge device, the at least one edge device relating to a networked computing system that is usable to store information.

9. The method of claim 8, wherein the at least one edge device includes at least one from among a private cloud provider and a public cloud provider, the at least one edge device corresponding to an ingress point that is determined to be closest to customer network traffic.

10. The method of claim 1, further comprising:
generating, by the at least one processor, at least one graphical element, the at least one graphical element including information relating to at least one from among the at least one model, the at least one training data set, the at least one predicted first web resource, and the automatic caching; and
displaying, by the at least one processor via a graphical user interface, the at least one graphical element.

11. A computing device configured to implement an execution of a method for facilitating predictive caching of data, the computing device comprising:
a processor;
a memory; and
a communication interface coupled to each of the processor and the memory,
wherein the processor is configured to:
retrieve raw data relating to user activity for a plurality of users, the user activity including a history of web resources accessed by a user;
convert the raw data into a structured data set based on at least one predetermined criterion;
generate at least one model based on the structured data set;
train the at least one model by using a training data set, the training data set including the user activity for a predetermined period of time;
determine, by using the trained at least one model, at least one predicted first web resource for the user; and
automatically cache, in a memory, the at least one predicted first web resource.

12. The computing device of claim 11, wherein the processor is further configured to:
determine a non-personalized baseline from the raw data, the non-personalized baseline corresponding to at least one predicted group web resource for the plurality of users;
determine at least one predicted second web resource for the user based on the non-personalized baseline; and
automatically cache, in the memory, the at least one predicted second web resource.

13. The computing device of claim 11, wherein the processor is further configured to:
associate at least one data element in the raw data with the user;
determine a personalized baseline from the at least one data element, the personalized baseline corresponding to at least one predicted personal web resource for the user;
determine at least one predicted third web resource for the user based on the personalized baseline; and
automatically cache, in the memory, the at least one predicted third web resource.

14. The computing device of claim 11, wherein the raw data includes at least one from among user behavior data and application programing interface log data.

15. The computing device of claim 11, wherein, for the converting, the processor is further configured to:
translate the raw data into a numeric format;
identify at least one error in the translated raw data, the at least one error including at least one from among a missing value and an outlier value in a data table; and
automatically correct the identified at least one error.

16. The computing device of claim 11, wherein the at least one model includes at least one from among a machine learning model, a mathematical model, a process model, and a data model.

17. The computing device of claim 11, wherein the processor is further configured to:
determine a geographical location of the user based on at least one from among a corresponding user activity and a corresponding user profile;
identify at least one adjacent memory based on at least one predetermined guideline, the at least one predetermined guideline including a distance to the determined geographical location of the user; and
automatically cache, in the identified at least one adjacent memory, the at least one predicted first web resource.

18. The computing device of claim 17, wherein the at least one adjacent memory includes at least one edge service that prioritizes data communication and data collection from at least one edge device, the at least one edge device relating to a networked computing system that is usable to store information.

19. The computing device of claim 18, wherein the at least one edge device includes at least one from among a private cloud provider and a public cloud provider, the at least one edge device corresponding to an ingress point that is determined to be closest to customer network traffic.

20. The computing device of claim 11, wherein the processor is further configured to:
generate at least one graphical element, the at least one graphical element including information relating to at least one from among the at least one model, the at least one training data set, the at least one predicted first web resource, and the automatic caching; and
display, via a graphical user interface, the at least one graphical element.

* * * * *